(12) United States Patent
Schreck et al.

(10) Patent No.: US 9,760,605 B2
(45) Date of Patent: Sep. 12, 2017

(54) SYSTEM AND METHOD FOR PRECISE QUANTILE DETERMINATION

(71) Applicant: Software AG, Darmstadt (DE)

(72) Inventors: Daniel Schreck, Saarbrücken (DE); Sebastian Millies, Gersheim (DE); Patrick Utter, Püttlingen (DE)

(73) Assignee: Software AG, Darmstadt (DE)

(*) Notice: Subject to any disclaimer, the term of this patent is extended or adjusted under 35 U.S.C. 154(b) by 488 days.

(21) Appl. No.: 14/481,211

(22) Filed: Sep. 9, 2014

(65) Prior Publication Data

US 2016/0062999 A1 Mar. 3, 2016

Related U.S. Application Data

(60) Provisional application No. 62/043,543, filed on Aug. 29, 2014.

(51) Int. Cl.
*G06F 17/30* (2006.01)

(52) U.S. Cl.
CPC .............. *G06F 17/30477* (2013.01)

(58) Field of Classification Search
CPC .................................. G06F 17/30477
USPC .................................. 707/748, 700
See application file for complete search history.

(56) References Cited

U.S. PATENT DOCUMENTS

| | | | |
|---|---|---|---|
| 6,108,658 A | 8/2000 | Lindsay et al. | |
| 6,343,288 B1 | 1/2002 | Lindsay et al. | |
| 2010/0153064 A1* | 6/2010 | Cormode | G06F 17/18 702/179 |
| 2013/0218909 A1 | 8/2013 | Chu et al. | |
| 2013/0325825 A1* | 12/2013 | Pope | G06F 17/30283 707/700 |

OTHER PUBLICATIONS

"Approximate Medians and other Quantiles in One Pass and with Limited Memory", By: Gurmeet Manku, Published 1998 http://delivery.acm.org/10.1145/280000/276342/p426-manku.pdf?ip=151.207.250.51&id=276342&acc=Active%20SERVICE&key=C15944E53D0ACA63%2E4D4702B0C3E38B35%2E4D-4702B0C3E38B35%2E4D4702B0C3E38B35&CFID=907062956&CFTOKEN=99382355&__acm__=148856132.*

"A Fast Algorithm for Approximate Quantiles in High Speed Data Streams", By: Qi Zhang, Published 2007 http://ieeexplore.ieee.org/stamp/stamp.jsp?arnumber=4274974.*

Gurmeet Singh Manku et al., "Approximate Medians and other Quantiles in One Pass and with Limited Memory", Proceedings of the 1998 ACM SIGMOD International Conference on Management of Data, pp. 426-435, Jun. 1-4, 1998, Seattle, Washington, USA. (Discussed on pp. 2-3 of the specification).

(Continued)

*Primary Examiner* — Chelcie Daye
(74) *Attorney, Agent, or Firm* — Posz Law Group, PLC

(57) ABSTRACT

A system for precise quantile determination derives a maximum relative error value ε that guarantees that an exact result for every quantile can be determined in no more than two passes. The system computes a quantile summary of the datapoints, that specifies lower and upper bounds of the quantile ranks for selected datapoints, and determines for each quantile rank, the lower and upper bounds for values between which the quantile must occur. The system filters out in a second pass those datapoints that are not within the bounds to provide subsets; and computes from the quantile ranks and the subsets, the precise quantiles.

15 Claims, 4 Drawing Sheets

(56) References Cited

OTHER PUBLICATIONS

Michael Greenwald et al., "Space-Efficient Online Computation of Quantile Summaries", Proceedings of the 2001 ACM SIGMOD International Conference on Management of Data. Santa Barbara, California, USA. May 21-24, 2001. (Discussed on p. 3 of the specification).
Qi Zhang et al., "A Fast Algorithm for Approximate Quantiles in High Speed Data Streams", Proceedings of the 19th International Conference on Scientific and Statistical Database Management, p. 29, Jul. 9-11, 2007. (Discussed on pp. 3-4 of the specification).
Lixin Fu et al., "Novel Algorithms for Computing Medians and Other Quantiles of Disk-Resident Data", Proceedings of the 2001 International Database Engineering and Applications Symposium, pp. 145-154, Jul. 16-18, 2001. (Discussed on p. 4 of the specification).
Michael Greenwald et al., "Power-Conserving Computation of Order-Statistics over Sensor Networks", University of Pennsylvania Scholarly Commons, Jun. 14, 2004.
J. I. Munro et al., "Selection and sorting with limited storage", in Theoretical computer science vol. 12, 1980 I. (Abstract only; discussed on p. 2 of the specification).
Ira Pohl, "A Minimum Storage Algorithm for Computing the Median", Technical Report IBM Research Report RC 2701 (#12713), IBM T J Watson Center, Nov. 1969. (Abstract only; discussed on p. 2 of the specification).
Office Action issued by the U.S. Patent Office on Jan. 20, 2017 in related U.S. Appl. No. 15/062,574.

\* cited by examiner

SYSTEM AND METHOD FOR PRECISE QUANTILE DETERMINATION

TECHNICAL FIELD

The technical field relates in general to statistical analysis using quantile determination.

BACKGROUND

Statistical measures play an important role for the analysis of data sets. One general class of such statistical measures consists of the quantiles of a set of data. Quantiles of different ranks can together summarize what data is stored and how it is distributed.

Computers permit rapid evaluation of quantiles of large data sets. While the availability of affordable computer memory (volatile and permanent) is steadily increasing, there continue to be limitations associated with such memory. Typical algorithms will re-order the elements of the data set in place or they will need additional memory that is at least half of the size of the original data set. Several conventional techniques, such as those discussed below, provide various quantile determination algorithms.

Simple and Precise Algorithms.

A typical simple determination algorithm requires sorting the values and then picking the element in the needed position in the array. Such an algorithm needs O(N) space, where N is the number of rows. Assuming, for example, that one datapoint consumes 8 bytes (=64 bits), determining a quantile over N=100 million rows needs 800 MB of temporary memory. Traditional commodity computer hardware provides the capability for using this type of algorithm with only small inputs or may require the user to swap out to a disk. The sorting requires O(N log N) runtime. Such an approach can be used to determine several quantiles on the data without extra memory or runtime cost.

Selection Algorithms.

Better runtime performance could be achieved by using a "Selection algorithm", but just like sorting, it will need space proportional to the number of input elements (https://en.wikiedia.org/w/index.php?title=Selection_alorithm&oldid=622007068). Optimizations regarding the needed memory are possible if only a single quantile is requested and that quantile has a very low or very high quantile rank (for example, 0.1 or 0.9).

Lower Bound for Precise Algorithms.

Pohl (I. Pohl, "A Minimum Storage Algorithm for Computing the Median", Technical Report IBM Research Report RC 2701 (#12713), IBM T J Watson Center, November 1969) proved in 1969 that any deterministic algorithm that computes the exact median in one pass needs temporary storage of at least N/2 elements. Munro and Paterson (J. I. Munro and M. S. Paterson, "Selection and sorting with limited storage", in Theoretical computer science vol. 12, 1980) proved in 1980 that the minimum space required for any precise algorithm is $\Theta(N^{**}1/p)$, with p being the number of passes over the data. Accordingly, a more precise result with less memory than O(N) may be achieved by implementing more passes over the data. In their proof, Munro and Paterson sketch an algorithm for determining the quantiles in several passes with almost no extra memory.

Disk-Based Sorting.

Another conventional alternative is to write the values to disk and then sort them. However, disk-based sorting is orders of magnitude slower than in-memory operation. Therefore, this is not a viable option for interactive applications where response times matter.

Approximation Algorithms.

In more recent times there have been a number of publications that describe low memory quantile calculations that give up some of the precision requirements in favor of lower memory consumption. Three of these known techniques are now discussed.

1. Manku, Rajagopalan, and Lindsay (1998)

In 1998 Manku, Rajagopalan, and Lindsay (G. Manku, S. Rajagopalan, B. Lindsay, "Approximate medians and other quantiles in one pass and with limited memory", in Proceedings of the 1998 ACM SIGMOD International Conference on Management of Data) presented an approximation algorithm as an improvement on Munro and Paterson's 1980 work:

Space: $O(1/\epsilon \log^2(\epsilon N))$

Runtime: not stated

The error $\epsilon$ is the factor by which a quantile reported by the algorithm may differ from the real quantile. A quantile is said to be "$\epsilon$-approximate" if its real rank is guaranteed to be within $[r-\epsilon N; f+\epsilon N]$ of the rank r of the reported quantile value. This is not to be confused with the number of precise digits of the reported value. Results are proven to be $\epsilon$-approximate. As seen above, the memory requirement depends on the desired maximum error.

Manku, et al. built upon the algorithm described by Munro and Paterson in 1980. They change one pass of the original algorithm so that this one pass yields a quantile that is correct within the error bounds. After just a single pass they have the approximate quantile. Manku et al. assert that their algorithm needs less space than that of Munro and Paterson. Related patents are U.S. Pat. No. 6,108,658A and U.S. Pat. No. 6,343,288B1.

2. Greenwald, Khanna (2001)

In 2001, Greenwald and Khanna (M. Greenwald, S. Khanna, "Space-efficient Online Computation of Quantile Summaries", in Proceedings of the 2001 ACM SIGMOD International Conference on Management of Data) presented an algorithm for the space-efficient computation of quantile summaries.

Space: $O(1/\epsilon \log(\epsilon N))$

Runtime: high cost (not reported)

Results were proven to be $\epsilon$-approximate. As seen above, the memory requirement depends on the desired maximum error.

Real-world results have been obtained through a modified version of the algorithm, rather than the one outlined in the Greenwald and Khanna article. With the modified variant, the memory requirements in terms of stored items were about half as big as for the Manku et al. method, but the needed data structures are more complex.

3. Zhang, Wang (2007)

In 2007, Zhang and Wang (Qi Zhang, Wei Wang, "A Fast Algorithm for Approximate Quantiles in High Speed Data Streams", in 19$^{th}$ International Conference on Scientific and Statistical Database Management, 2007) presented an algorithm for the computation of approximate quantiles with the following space and time complexities:

Space: $O(1/\epsilon \log^2(\epsilon N))$

Runtime: $O(N \log(1/\epsilon \log(\epsilon N)))$

Zhang and Wang demonstrated through several experiments that their algorithm is about 200 times faster than Greenwald and Khanna algorithm. The Zhang, Wang algorithm has deterministic bounds on the maximum error. The summary data structure from which the approximate quantile is read as the last step in the execution of the algorithm also contains guaranteed minimum and maximum ranks for all values stored in the summary.

Precise Results Using an Approximation Algorithm.

In 2001, Fu and Rajasekaran (L. Fu, S. Rajasekaran, "Novel Algorithms for Computing Medians and Other Quantiles of Disk-Resident Data", in Proceedings of the 2001 International Database Engineering and Applications Symposium) designed and compared different algorithms for computing quantiles on disk-resident data. Their use case is the computation of quantiles from data residing on a disk with the data being bigger than available main memory. Fu and Rajeskeran assert that in the case of an external algorithm, the key issue is to minimize the number of passes needed to solve the problem. They make use of the Manku et al. algorithm and adapt it to deliver precise results. Fu and Rajasekaran state that "It should be noted here that the original algorithm of Manku et al. was proposed for computing approximate quantiles. We adapt this algorithm for exact selection by using the given rank error guarantee . . . . The paper of Manku et al . . . gives the upper bound of the rank difference between real target and output result. From the error guarantee, we can compute the bounds that bracket the target, thus adapting the approximate quantiling algorithm to the selection problem."

In many application areas the calculation of exact results is essential. In empirical sciences statistical evaluations are at the base of many findings and theories. As data collection in these sciences is often associated with a high cost, the empirical significance of the findings is often at stake. At least the calculations on the data that is obtained have to be right and must not add another source of error. In a business domain many companies base important business decisions on statistical evaluations. It is imperative that costly decisions are based on the correct data.

At the same time, with ever growing volumes of data and data analysis becoming increasingly interactive, it is more important than ever that algorithms operate quickly (by working in memory only and using a fast algorithm with a minimum number of passes) and utilize memory efficiently.

Existing algorithms aim to either: (1) deliver a precise result using a fixed amount of memory by trading in runtime performance (for example, multiple passes; Munro and Paterson); or (2) use less memory, but only deliver approximate results (for example, Manku et al.)

The concept of Fu and Rajasekaran of using the approximation algorithm of Manku et al. as an initial step for determining precise quantiles constitutes a mix of both of the points above. It employs an approximation algorithm, but fixes the available memory to 200 KB. Thus, although the authors claim that minimizing the number of passes is essential, the algorithm they use does not provide means for guaranteeing that the number of passes is indeed minimal.

One or more embodiments discussed herein can address the aforementioned problems, with traditional systems, by fixing the number of passes to a certain number, such as two, and then optimizing the amount of required memory. More specifically, this can be achieved by exploiting properties of an approximation algorithm for preprocessing the data in the first pass in such a way that the second pass is guaranteed to find an exact, precise result with acceptable memory consumption.

SUMMARY

Accordingly, one or more embodiments provide a method, system and/or non-transitory computer readable medium for precise quantile determination.

Accordingly, an embodiment provides a method for precise quantile determination comprising receiving, by a processor, datapoints and one or more quantiles to be computed; determining, by the processor, from the datapoints and the one or more quantiles to be computed, a maximum relative error value $\epsilon$ that guarantees that an exact result for every quantile is determined in no more than two passes; computing, by the processor, in a first pass of the datapoints using an approximation algorithm and $\epsilon$, a quantile summary of the datapoints that specifies lower and upper bounds of the quantile ranks for selected datapoints; determining, by the processor, for each quantile rank, the lower and upper bounds for values between which the quantile must occur; filtering out, by the processor, in a second pass over the datapoints those datapoints that are not between the lower and upper bounds to provide subsets within the lower and upper bounds; and computing, by the processor, from the quantile ranks and the subsets within the lower and upper bounds, the precise quantiles.

According to another embodiment, the value for the maximum relative error $\epsilon$ is determined by solving the following equations:

$$M_{approx}=(b+3)3dL+hL$$

$$M_{exact}=4\epsilon NdM$$

$$M_{approx}=M_{exact},$$

such that $M_{approx}$ and $M_{exact}$ are memory consumptions, M is the number of requested quantiles, b is a block size for partitioning input buffers, d is memory per entry, L is a number of levels in the quantile summary, h is additional overhead for pointers that connect the levels in the quantile summary, and N is an amount of datapoints.

In another embodiment, when the lower and upper bounds for all quantiles are identical, then the precise quantile determination is complete.

In yet another embodiment, the filtering out step further comprises: collecting, by the processor, the datapoints that lie between the lower and upper bounds; counting/excluding, by the processor, the datapoints that are on or below the lower bound; sorting, by the processor, the datapoints that lie between the lower and upper bounds; selecting, by the processor, a datapoint of a requested rank from the sorted datapoints; and simultaneously correcting, by the processor, the requested rank by the number of datapoints on or below the lower bound.

According to another embodiment, when multiple quantiles are requested simultaneously, the first pass will create a quantile summary once for all of the multiple quantiles.

According to yet another embodiment, the algorithm has a runtime complexity of $O(N \log(1/\epsilon \log(\epsilon N)))$, such that N is the size of the input.

An embodiment provides a system for precise quantile determination that includes a memory, and configured to, based on instructions stored in memory, perform a method according to one or more of these embodiments.

Still another embodiment provides a non-transitory computer readable medium, which can perform a method according to one or more of these embodiments.

Yet another embodiment provides a method for precise quantile determination comprising receiving, by a processor, an input of input elements and a number of quantiles to be computed; deriving, by the processor, from a size of the input and the number of quantiles to be computed, a value for $\epsilon$ that guarantees that an exact result for every quantile can be determined in no more than two passes; computing, by the processor, in a first pass of the datapoints using an approximation algorithm and $\epsilon$, a quantile summary of the datapoints that specifies lower and upper bounds of the quantile ranks for selected datapoints; determining, for each quantile rank, the lower and upper bounds for values between which the quantile must occur; determining, by the processor, for each quantile, whether the upper and lower bounds are identical and thus there already is an exact result. The symbol $\epsilon$ is a maximum relative error. If the upper and the lower bounds for all quantiles are identical, then the precise quantile determination is complete. If there is no exact result for some quantiles, then there is a pass over the input for those quantiles and the method for precise quantile determination further comprises: collecting, by the processor, all input elements that lie between the upper and the lower bounds; counting/excluding, by the processor, the input elements that are on or below the lower bound; sorting, by the processor, the collected input elements that lie between the upper and the lower bounds; selecting, by the processor, an input element of a requested rank from the sorted input elements; and simultaneously correcting, by the processor, the requested rank by the number of datapoints on or below the lower bound.

One, or a combination of more than one, or all, of the above embodiments, can be combined and provided as a single embodiment.

Moreover, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

DETAILED DESCRIPTION

Quantiles are playing an important role in the area of statistical analysis. In the area of event driven architecture ("EDA") these events have to be analyzed in an optimal way and must be processed quickly and effectively. A set of significant figures of these streams is known as the quantiles. Although the calculation of quantiles is very simple, consuming very large input numbers causes performance and resource (for example, memory) bottlenecks. It is therefore becoming a rather complex field to analyze and disclose any improvements.

In overview, the present disclosure concerns a system and method to precisely determine one or more quantiles on a set of data while consuming little additional memory, and without modifying the input data, all performed with a short runtime. More particularly, various inventive concepts and principles are embodied in methods, devices, and/or systems related to quantile determinations, such as for use in analysis of a set of data, which not only can incorporate an existing, proven, quantile algorithm that is known to find the results with a given error rate (but has other undesirable effects), but which nevertheless demonstrates a good performance and resource usage. The pre-calculated results can be used for the continued calculation that yields exact results, while still adhering to good performance (for example, as measured by the number of passes) and resource usage. The results of the quantiles can be utilized, for example, as a statistical evaluation based on correct data rather than an approximation, such as used in business decisions.

I. CONCEPT

A primary goal is to find exact quantiles with good performance and using little memory. As proven by Munro and Paterson (1980) a single pass algorithm needs at least $O(n)$ space, which is too much. Having many passes will result in poor performance when processing large amounts of data. Thus, it is preferable to find an exact result with a minimum number of passes. Accordingly, the present system fixes the number of passes at two and then optimizes the amount of required memory. This is achieved by exploiting properties of an approximation algorithm that will permit us to use it for preprocessing the data in the first pass in such a way that the second pass is guaranteed to find an exact result with acceptable memory consumption.

First, Section A provides an overview of the overall method, and a discussion of two important features. Then Section B discusses narrowing down the search space, Section C discusses an exact last pass, and Section D discusses minimizing the number of passes and memory consumption. Sections E and F discuss optional features of adaption to hard memory limits, and handling multiple quantiles at one. Section G finishes with a discussion of runtime complexity.

A. Overview

Figure 1:
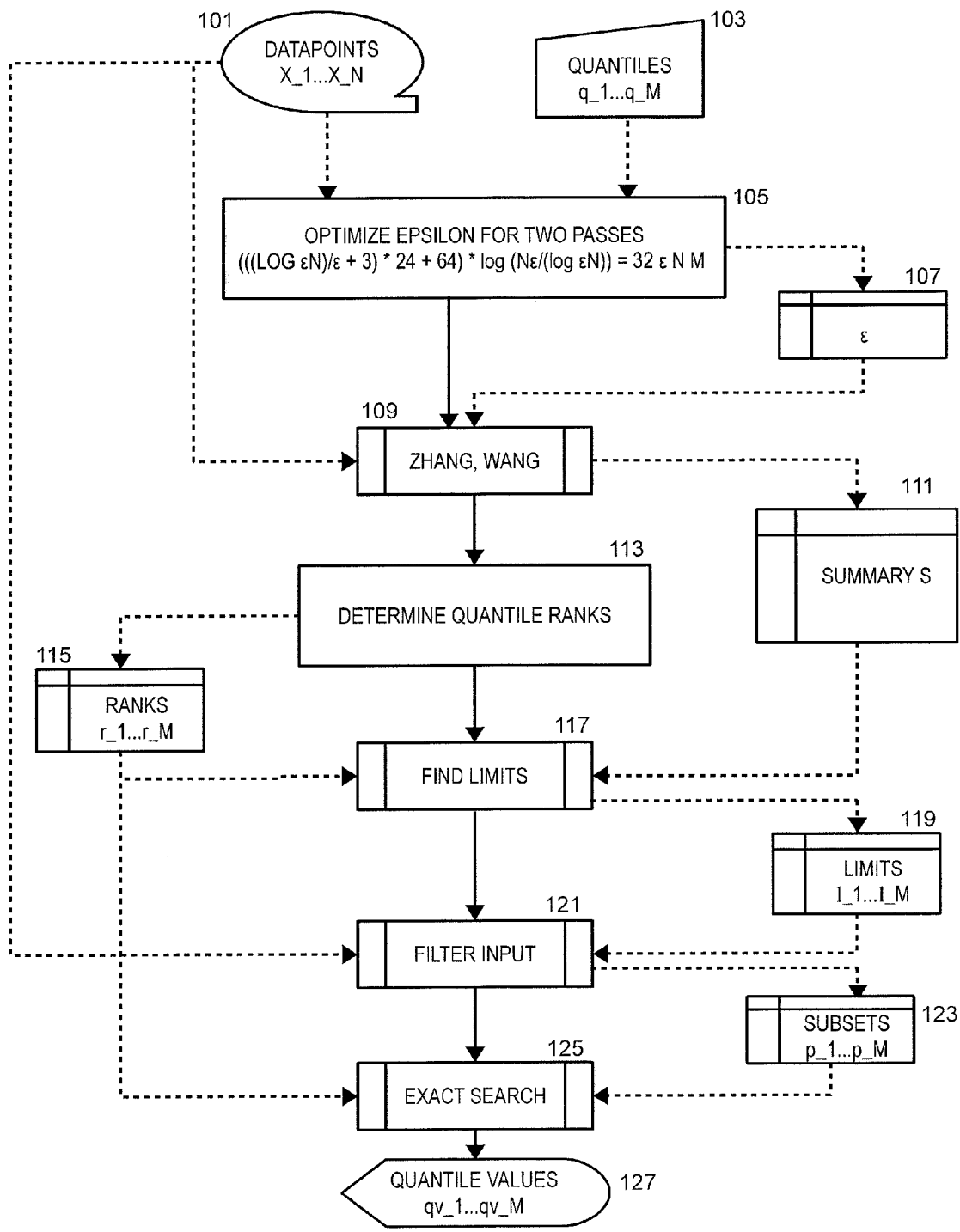
FIG. 1 is a flowchart illustrating a method for precise quantile determination.
Figure 2:
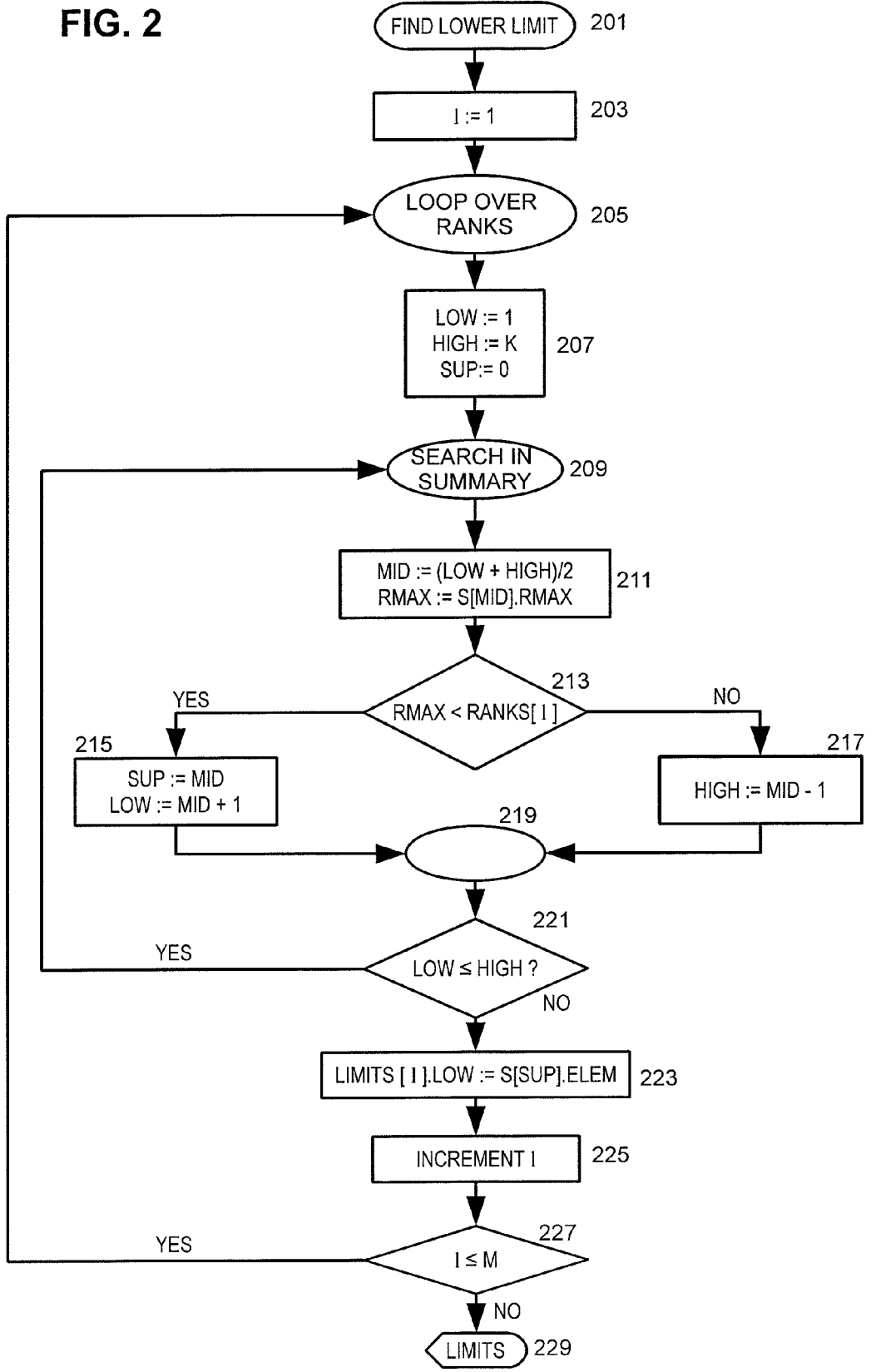
FIG. 2 is a flowchart illustrating a method for finding the lower limit.
Figure 3:
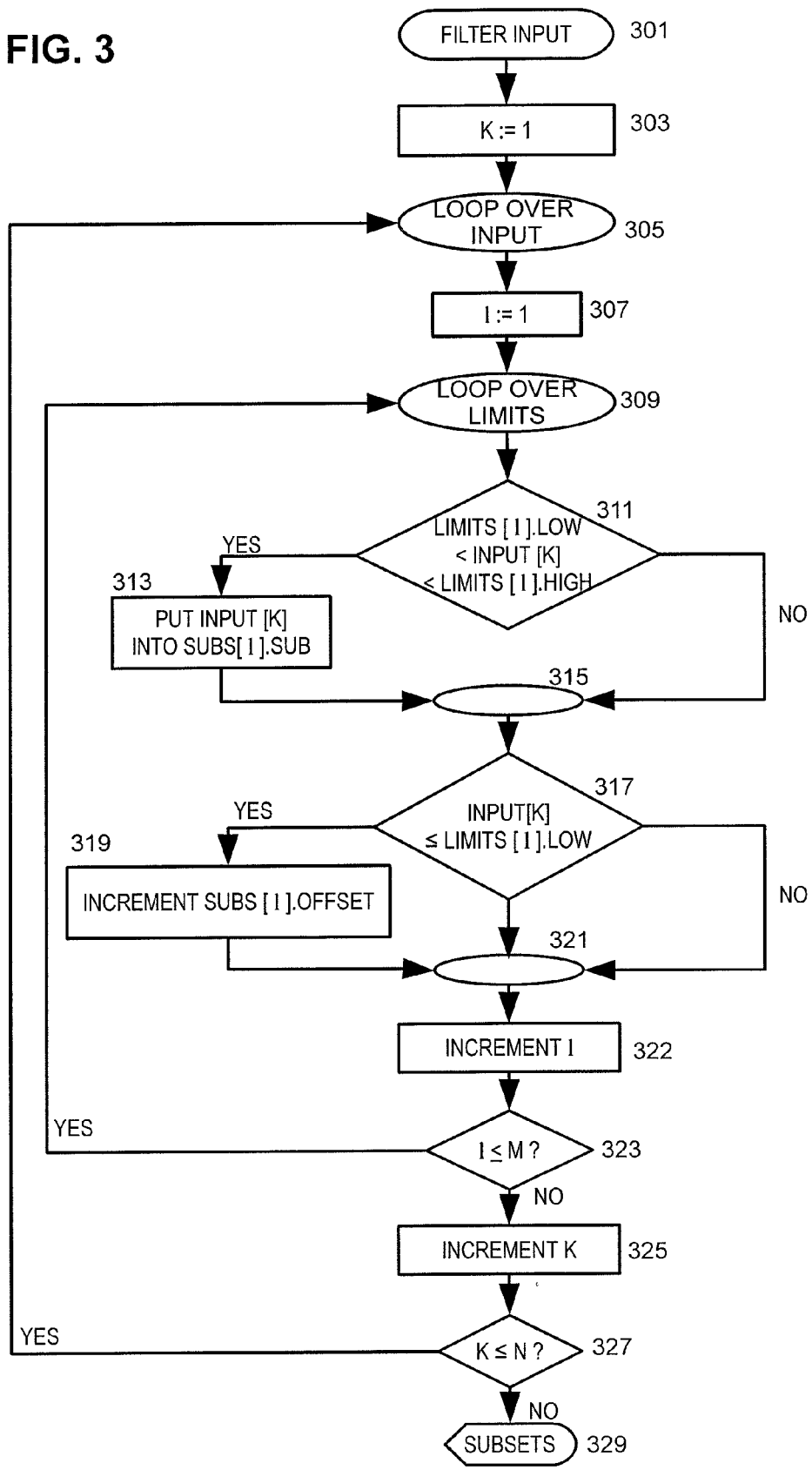
FIG. 3 is a flowchart illustrating a method for filtering the input.

FIG. 1 provides an overview of the overall method for precise quantile determination, and FIG. 2 and FIG. 3 illustrate two important features of FIG. 1. FIG. 2 is an illustration of finding the limit (using the lower limit, since finding the upper limit is analogous), and FIG. 3 is an illustration of filtering the input.

Reference is made to FIG. 1, which illustrates the overall method for precise quantile determination. In FIG. 1, the solid line indicates control flow and the broken line indicates data flow. Datapoints 101 and quantiles 103 are input to a process to optimize 105 the maximum relative error $\epsilon$ for two passes, for example in accordance with the following:

$$(((\log \epsilon N)/\epsilon+3)*24+64)*\log(N\epsilon/(\log \epsilon N))=32\epsilon NM$$

Typically, the datapoints 101 are provided to the overall method as external data with sequential access, and the quantiles can be manually input.

Once s is determined 107, $\epsilon$ can be stored in internal memory. Then, the known Zhang, Wang approximation algorithm (also referred to herein as the "Zhang, Wang algorithm") can be applied 109, utilizing, as input, the datapoints 101, and $\epsilon$ which resulted from the optimization 105. As is known, the Zhang, Wang approximation algorithm results in a Summary data structure (also referred to herein as a "quantile summary") from which the approximate quantile is read as the last step in the execution of their algorithm, but which also contains guaranteed minimum and maximum ranks for all values stored in the summary S.

The Summary S 111 which results from the Zhang, Wang approximation can be used, along with other data, to a process to find 117 the upper and lower limits. The quantile ranks are determined 113, for example using conventional techniques, resulting in the ranks r_1 . . . r_M. The ranks 115 can be stored in memory for further use. Data from the ranks 115 and the Summary S 111 which resulted from the Zhang, Wang approximation algorithm then are input to a process to find 117 the upper and lower limits 119 (which is further discussed in FIG. 2), resulting in limits 119, l_1 . . . l_M. The datapoints 101 and the limits 119 are provided as input to a filter input process 121 (which is the second pass over the datapoints and further discussed in connection with FIG. 3). The filter input process 121 produces subsets 123, p_1 . . . p_M, which can be stored in memory for later use. Then, the exact, precise search process 125 can be performed, using, as input, the ranks 115 and the subsets 123, r_1 . . . r_M and p_1 . . . p_M. The exact, precise search process 125 results in quantile values qv_1 . . . qv_M. The quantile values which result can be displayed 127, or otherwise output for further use according to known techniques.

Referencing FIG. 2, the process 117 for determining the limits is illustrated in detail with reference to the lower limit. Note that an analogous process can be used for determining the upper limit. To find the lower limit 201, the variable "l" is set 203 to be the value 1. The process then loops over ranks 205 1 . . . M.

In the ranks loop, the process sets 207 the values for LOW (:=1), HIGH (:=K), and SUP (:=0). A search is conducted in the Summary 209 as follows: The MID of the search region is determined as (LOW+HIGH)/2 and the guaranteed maximum rank at that position in the summary S[MID] is stored 211 in RMAX. The process determines 213 whether this maximum rank is smaller than the queried rank RANKS[l]. In the situation that RMAX<RANKS[l] the search must be continued to the right of MID, therefore the process sets 215 SUP:=MID and LOW=MID+1. In the situation that RMAX>=RANKS[l] the search must be continued to the left of MID, therefore the process sets 217 HIGH:=MID−1. At the connector 219, these values for LOW, and HIGH are considered to determine 221 whether the search region has become so narrow that SUP is the index of the result for this quantile. If LOW is less than or equal HIGH, the binary search continues 209. If not, then the following equation is applied to yield the lower limit for the quantile rank l:

Limits[l].LOW:=$S[SUP]$.elem

After incrementing 225 the variable "l", the process determines 227 whether variable l≤M, the number of quantile ranks. If so, then the process returns to "loop over ranks" 205. If not, then the upper and lower limit results are returned 229.

Referencing FIG. 3, the filter input process 301 will now be discussed and described. The variable K is initially set 303 at the value 1. The process will loop 305 over input 1 . . . N, for all of the input elements. The variable "l" is set 307 to be the value 1. The process then will loop 309 over limits 1 . . . M, for all of the input limits. The process determines 311 whether the input[K] falls within the upper and lower limits, that is, Limits[l].low<input[K]< Limits[l].high. When input[K] falls within the limits, the input[K] is placed 313 into a subset, subs[l].sub and the process proceeds to connector 315. When input[K] does not fall within the upper and lower limits, then the process proceeds directly to connector 315 without putting input[K] into the subset. From connector 315, a second determination 317 evaluates whether the input[K] is less than or equal to the lower limit, that is, input[K]<limits[l].low. When input [K] is less than or equal to the lower limit, then the subset, subs[l].offset is incremented 319 by 1 and the process proceeds to connector 321. When input[K] is not less than or equal to the lower limit, then the process proceeds directly to connector 321 without incrementing the subset, subs[l].offset. After incrementing 322 the variable l, the process then determines 323 whether the variable "l" is less than or equal to M, the number of requested quantile ranks. When the variable "l" is less than or equal to M, then the process returns to loop 309 over limits. When the variable "l" is not less than M, then K is incremented 325 by 1. It is then determined 327 whether K is less than or equal to N, the number of input elements. When K is less than or equal to N, that is, when input elements remain for processing, then the loop 305 over input elements repeats. If not, then the subsets are returned 329.

B. Narrowing Down the Search-Space

The known algorithm from Zhang, Wang is used to create a quantile summary, sometimes referred to herein simply as "summary" or "Summary." Due to the design of the Zhang, Wang algorithm, the quantile summary is guaranteed to contain a value from the input for all possible quantile ranks with a maximum relative error of $\epsilon$. This means that it contains elements of the input so that the rank distance between two adjacent elements is at most $2\epsilon$. In addition to the values, the summary also contains the minimum and maximum possible rank for each of the elements that it contains. In the Zhang, Wang algorithm these minimum and maximum possible ranks are maintained during the execution of the algorithm and used to query the summary for a concrete, yet approximate, quantile in the end.

The guaranteed ranks permit the system to name the region where the precise quantile result is to be found in the input. From the minimum and maximum ranks, it is determined how many datapoints at most exist in the input in this region.

Elements in the input do not have any rank information. Therefore the process has to determine the region using the minimum and maximum values that it can contain. Although not obvious, these can be derived from the summary structure. The intention is to find values as close as possible to the final result, thereby minimizing the search region, but at the same time ensuring that the region is not so narrow that the real value is accidentally discarded. Here the rank information in the summary is essential. The lower bound of the region is the largest element of the summary whose maximum possible rank is smaller than the rank sought. The upper bound is the smallest element whose minimum rank is bigger than the rank sought. Thus, the search region for the next pass is determined.

The algorithm guarantees that it has an element for all quantile ranks so that the rank of the returned element is guaranteed to deviate from the real rank r by $\epsilon N$ at most. In other words, a result element has a guaranteed minimum rank of at least $r-\epsilon N$ and a guaranteed maximum rank of at most $r+\epsilon N$. If an element in the summary is found that can be used as the approximate result, then the elements below and above it, that fulfill the lower and upper bound criteria mentioned above, are each at most $2\epsilon N$ ranks away. In total the rank difference between lower bound and upper bound can be at most 4εN. So N'≤4εN is the guaranteed maximum size of the remaining region to be searched.

In real-world scenarios, the size of the region can be smaller. In contrast to other algorithms (like the one by Manku et al. that was used by Fu et al.), the summary that the Zhang, Wang algorithm produces can yield a guaranteed maximum region size that is implicitly built during the processing of the input data. The inventors have observed that it is potentially closer to the real size of the region than the theoretical, general guarantees of other algorithms. Thereby, the inventors concluded that the Zhang, Wang algorithm can permit the saving of some additional memory during the next pass over the input data.

C. Exact Last Past

In the last pass, the system can ignore all values outside the determined range and can collect all those values inside the range, for example in a list. At the same time, the system can count how many values have been discarded because they were on or below the lower bound of the range. Once all values have been collected, the system can sort the values and then read the desired quantile value from the rank's location in the sorted list offset by the rank of the lower bound.

D. Minimizing Number of Passes and Memory Consumption

The system can minimize the total number of passes to two and then optimize the amount of required memory. From the known size of the input, the system can determine an optimal s so that the memory needed by the final exact pass is guaranteed to be the same as or less than the memory needed for the initial approximate pass. This way the system makes optimal use of the memory that needs to be allocated. The optimal a is determined by equating the memory requirements of the first and second pass for a given N and M (where N is the number of datapoints and M is the number of one or more quantiles to be determined) and solving for ε.

The concrete memory requirements depend on the details of the implementation and the machine architecture. Solving the equation might only be possible through numerical methods.

The algorithm as used in the system disclosed herein can determine the median in two passes over 1 billion (64-bit) elements using about 12 MB of memory. Thus, the system disclosed herein can determine the exact quantile out of 8 GB of memory with just 12 MB of temporary storage. By comparison, the simple precise algorithm would need 8 GB of temporary storage. Thus, the present system needs just 0.15% of the memory which is required by the simple precise algorithm. The algorithm as used in the present system optimizes the memory consumption automatically. Traditional algorithms are incapable of this and therefore require more memory and/or passes, resulting in slower execution.

E. Adaption to Hard Memory Limits

In an optional embodiment, when only a fixed amount of memory is available, the algorithm can be run in more than two passes. This idea is similar to that of Munro and Paterson, but using a better algorithm for determining the search region (that is, the algorithm by Zhang, Wang). The idea is to choose the smallest a that permits the algorithm to construct a Summary that still fits into the available memory. If the first pass does not yield a region that is small enough so that the available memory suffices for the exact algorithm, the process will continue running the approximation algorithm on the ever shrinking region until the memory suffices for the exact algorithm. This way, the amount of available memory determines the number of passes needed.

F. Multiple Quantiles

An optional embodiment can handle multiple quantiles. The summary structure that is created in the first pass of the approximate algorithm has approximately correct values for any and all quantiles. If multiple quantiles are requested at once, this first pass will create the summary only once for all of them. Only in subsequent passes does the processing need to be done separately on each of the regions obtained from the single summary for the different quantiles. See, for example, the pseudo code described herein.

G. Runtime Complexity

The two-pass variant of the algorithm needs to read the values twice. The processing in the first pass has a complexity of $O(N \log(1/\epsilon \log(\epsilon N)))$ and will narrow down the search space so that only a small fraction of the data will need significant processing in the second pass. All N elements of data have to be checked again, but the significant processing is copying and sorting only the small region of size N' that was determined in the previous pass. This processing has complexity $O(N' \log N')$. As N' is much smaller than N, the value is considered to be negligible. Therefore, the total complexity is the same as for the first pass.

II. IMPLEMENTATION

The implementation and sequence of steps of the precise quantile determination system and method can be implemented along the lines of the following, which are provided by way of example and not limitation:

Step 1. From the size of the input and the number of quantiles to be computed, derive a value for ε that guarantees that an exact result for every quantile can be found in, at most, two passes. For this purpose, determine the memory requirements for the approximate algorithm, determine the memory requirements for the exact algorithm, and equate the two quantities. In more detail: The Zhang, Wang algorithm internally makes use of a multi-level summary, which finally collapses into the simple structure that can be seen in the pseudo code detailed below. However, for determining the memory requirements, the peak consumption is considered. Zhang, Wang provide the following formulae for the worst case:

Number of levels in the summary: $L=\log^2(N/b)$, where the block size for partitioning the data into buffers is defined as $b=(\log^2 \epsilon N)/\epsilon$.

Size of summary $g=(b+3) L$.

In actual fact, each level in the summary carries some additional overhead for pointers that connect the levels, which in the present implementation is h=64 bytes. The memory per entry in the summary is 3d=24 bytes (three 64-bit numbers, with one for the data elements itself and two for the associated limits, as shown in the pseudo-code herein). From this, the following memory consumption, in bytes, may be derived:

$$M_{approx}=(b+3)3dL+hL$$

The memory that is needed for the exact step is proportional to the size of the search region. As the search is done for each requested quantile in parallel, it is also proportional to the number M of quantiles in the query:

$$M_{exact}=4\epsilon NdM$$

Our implementation solves the equation $M_{approx}=M_{exact}$ for $\epsilon$ using an open source library for numeric computation. It is because these typically used libraries do not cope well with discontinuous functions, that we use the block size and level count as defined above. In reality, of course, these quantities are integral values as they are in the paper by Zhang, Wang, as well as in the actual implementation of the Zhang, Wang algorithm which is used. However, the difference is negligible for all but tiny input sizes. The quantities would typically be integral values.

When using a numeric algorithm, care must be taken if N is very small. In that case the numeric solvers might yield wrong results due to the logarithms involved. The precise computation is more effective for these small input sizes, so the sophisticated algorithm is not used at all in this case. A threshold of, for example, N<311 can exist if only one quantile is requested, although this optimization is not shown in the pseudo code below.

Step 2. Employ an implementation of the Zhang, Wang algorithm to compute a summary of the input from which it is possible to derive lower and upper bounds for the ranks each input element can possibly occupy. Incomplete pseudo code for this algorithm may be found in the aforementioned Zhang, Wang reference.

Step 3. For each quantile, determine lower and upper bounds for the values between which an element of the quantile's rank must occur in the input. These bounds are determined by binary search over the rank limits in the summary, and then taking the corresponding values as the bounds.

Step 4. If the lower and upper bounds for all quantiles are identical, then the process is complete. If for any quantile, there is no exact result, then for those quantiles there is a pass over the input and then the following occurs:
  a. collect all elements that lie between the limits (exclusive);
  b. count the elements that are on or below the lower bound (these elements must not be included in the subset because the guaranteed upper bound on the required space would be lost in a case where there were many such elements);
  c. sort the collected elements; and
  d. select the element of the requested rank from the sorted subset, correcting the rank for the number of ignored (smaller) elements. The corrected rank can be out of range for the subset of elements in the case that many input elements were equal to one of the subset boundaries. In that case, the lower or upper bound is returned as appropriate.

The processing in step 4$a$ to 4$b$ is illustrated by the pseudo code for the method "filter input" and the corresponding flowcharts in FIG. 1 and FIG. 3. The pseudo code leaves the pass over the input elements implicit for the sake of stating the result more clearly, while the flow chart of FIG. 3 illustrates this loop explicitly.

In an extension of step 4 above, the collection of values with subsequent sorting could be replaced by another selection algorithm with lower memory consumption. In such a case, the memory consumption of this step (for arbitrary quantiles) can be halved at most.

III. EXAMPLE

The two-pass combination of approximation algorithm and precise second pass is more effective than directly applying the precise algorithm if the input is at least as big as a few hundred elements. This would be too much for a practical example in this case. Therefore, one can assume for this example that the equation of the memory consumption of the two algorithms yielded $\epsilon=0.2$ to demonstrate how the two passes work together to produce a precise quantile value.

Input data (21 elements): 9, 12, 17, 3, 1, 4, 2, 21, 11, 16, 13, 20, 15, 14, 5, 7, 8, 6, 19, 10, 18

The execution of the Zhang, Wang algorithm is illustrated in Table 1. The first column shows the input (if any), the second column shows the specific action that is executed, and the remaining columns show the results of the action. The syntax for the summary contents is as follows: $_iV_x$ with V being the value taken from the input, i being the minimum rank for this occurrence of the value, x being the maximum rank for this occurrence of the value. Several inputs are listed at once if they go into level 0 of the summary one after another. See, for example, descriptions of the different actions in the Zhang, Wang reference. The value b calculated by the algorithm from the given $\epsilon$ is 10.

TABLE 1

Example of Zhang, Wang Algorithm

| Input | Action | Temporary Storage | Summary Level 0 | Summary Level 1 | Summary Level 2 |
|---|---|---|---|---|---|
| 9 | | | 9 | | |
| 12 | | | 9, 12 | | |
| 17, 3, 1, (abbreviated) | | | 9, 12, 17, 3, | | |
| 4, 2, 21, | | | 1, 4, 2, 21, 11 | | |
| 11 | | | | | |
| 16 | Sort level 0 | 1, 2, 3, 4, 9, 11, 12, 16, 17, 21 | | | |
| | COMPRESS with $\epsilon = 1/b$ | $_1 1_1, {_3}3_3, {_5}9_5,$ $_7 12_7, {_9}17_9, {_{10}}21_{10}$ | | | |
| | Send to level 1 | | | $_1 1_1, {_3}3_3, {_5}9_5,$ $_7 12_7, {_9}17_9, {_{10}}21_{10}$ | |
| 13, 20, | (abbreviated) | | 13, 20, 15, 14, | $_1 1_1, {_3}3_3, {_5}9_5,$ | |
| 15, 14, | | | 5, 7, 8, 6, 19 | $_7 12_7, {_9}17_9, {_{10}}21_{10}$ | |
| 5, 7, 8, | | | | | |
| 6, 19 | | | | | |

TABLE 1-continued

Example of Zhang, Wang Algorithm

| Input | Action | Temporary Storage | Summary Level 0 | Summary Level 1 | Summary Level 2 |
|---|---|---|---|---|---|
| 10 | Sort level 0 | 5, 6, 7, 8, 10, 13, 14, 15, 19, 20 | | $_1 1_1, _3 3_3, _5 9_5,$ $_7 12_7, _9 17_9, _{10} 21_{10}$ | |
| | COMPRESS with $\epsilon = 1/b$ | $_1 5_1, _3 7_3, _5 10_5,$ $_7 14_7, _9 19_9, _{10} 20_{10}$ | | $_1 1_1, _3 3_3, _5 9_5,$ $_7 12_7, _9 17_9, _{10} 21_{10}$ | |
| | MERGE with level 1 | $_1 1_1, _3 3_3, _4 5_5,$ $_6 7_7, _8 9_9, _{10} 10_{11},$ $_{12} 12_{13}, _{14} 14_{15}, _{16} 17_{17},$ $_{18} 19_{18}, _{19} 20_{19}, _{20} 21_{20}$ | | | |
| | COMPRESS with $\epsilon = 2/b$ | $_1 1_1, _6 7_7, _{10} 10_{11},$ $_{14} 14_{15}, _{20} 21_{20}$ | | | |
| | Send to level 2 | | | | $_1 1_1, _6 7_7, _{10} 10_{11},$ $_{14} 14_{15}, _{20} 21_{20}$ |
| 18 | | | 18 | | $_1 1_1, _6 7_7, _{10} 10_{11},$ $_{14} 14_{15}, _{20} 21_{20}$ |
| | MERGE all levels | $_1 1_1, _6 7_7, _{10} 10_{11},$ $_{14} 14_{15}, _{15} 18_{20}, _{21} 21_{21}$ | | | |

The result of the final "MERGE" of the Zhang, Wang algorithm is called a root summary. This root summary is then used for determining the bounds for the precise second pass over the data.

To find the median (quantile rank 0.5), the quantile rank is multiplied with the number of elements in the input: 0.5×21=10.5. The literature differs as to what integer rank this should be mapped to. Without loss of generality, the assumption is that the user wants to have the upper median and round up. Thus, the rank of the element that is sought must be R=11.

Therefore the root summary is scanned for a lower bound element (L) and an upper bound element (H). Again, L is the largest element with a guaranteed maximum rank (strictly) less than 11. H is the smallest element with a guaranteed minimum rank strictly greater than 11. In this example, L=7 and H=14.

In the second pass over the input, all elements that are smaller than or equal to L are counted, elements between L and H are collected, and all elements equal to or larger than H are discarded. As illustrated in Table 2, the first column contains the incoming element while the second column lists the decision that the algorithm makes based on the value of the element. Columns number three and four list the number of elements equal to or less than L and the collected elements, respectively.

TABLE 2

Example: Second Pass for Determining the Median

| Input | Decision | Number of elements ≤ L | Collected elements |
|---|---|---|---|
| 9 | Collect (L < 9 < H) | 0 | 9 |
| 12 | Collect (L < 12 < H) | 0 | 9, 12 |
| 17 | Discard (H ≤ 17) | 0 | 9, 12 |
| 3 | Count (3 ≤ L) | 1 | 9, 12 |
| 1 | Count (1 ≤ L) | 2 | 9, 12 |
| 4, 2, 21, 11, 16 | (abbreviated) | 4 | 9, 12, 11 |
| 13, 20, 15, 14, 5 | (abbreviated) | 5 | 9, 12, 11, 13 |
| 7, 8, 6, 19, 10 | (abbreviated) | 7 | 9, 12, 11, 13, 8, 10 |
| 18 | Discard (H ≤ 18) | 7 | 9, 12, 11, 13, 8, 10 |

Afterwards, the simple precise algorithm sorts the collected six elements into the following order: 8, 9, 10, 11, 12, 13.

The requested rank R=11 must be offset against the number of elements smaller than or equal to L. The derived rank within the sorted, collected elements is R'=R−L=11−7=4. Thus the median of the full input is the fourth value within the sorted collection of elements: 11. The algorithm is completed and returns 11 as the result.

The result may be cross-checked by looking at the sorted input (1, 2, 3, 4, 5, 6, 7, 8, 9, 10, 11, 12, 13, 14, 15, 16, 17, 18, 19, 20, 21) and picking the value in the 11$^{th}$ position: 11. Accordingly, it is confirmed that the result determined by the algorithm is correct.

This input has a uniform distribution of values. In case of distributions with many occurrences of the same value, the calculation of the derived rank R' can result in a value smaller than 1 or greater than the number of collected elements. In that case the result is L or H, respectively. Then it is determined that there were several elements in the input with the same value as the respective border value.

If more than one quantile was requested, then just one summary is created through the algorithm by Zhang, Wang and then the values for the different parts of the input are collected simultaneously in the second pass. In this example, it is assumed that the user wants to collect not only the median, but also the third quartile (quantile rank 0.75).

As indicated above, $R_{0.5}=11$, $L_{0.5}=7$ and $H_{0.5}=14$. In addition, for the third quartile, $R_{0.7}=16$, $L_{0.7}=14$ and $H_{0.75}=21$. The processing is illustrated in Table 3.

TABLE 3

Example: Second Pass for Determining Both Median and Third Quartile Simultaneously

| | Third quartile | | | Median | | |
|---|---|---|---|---|---|---|
| Input | Decision | #elements ≤ $L_{0.75}$ | Collected elements | Decision | #element ≤ $L_{0.5}$ | Collected elements |
| 9 | Count | 1 | | Collect | 0 | 9 |
| 12 | Count | 2 | | Collect | 0 | 9, 12 |
| 17 | Collect | 2 | 17 | Discard | 0 | 9, 12 |
| 3 | Count | 3 | 17 | Count | 1 | 9, 12 |
| 1 | Count | 4 | 17 | Count | 2 | 9, 12 |
| 4, 2, 21, 11, 16 | (abbreviated) | 7 | 17, 16 | (abbreviated) | 4 | 9, 12, 11 |
| 13, 20, 15, 14, 5 | (abbreviated) | 10 | 17, 16, 20, 15 | (abbreviated) | 5 | 9, 12, 11, 13 |
| 7, 8, 6, 19, 10 | (abbreviated) | 14 | 17, 16, 20, 15, 19 | (abbreviated) | 7 | 9, 12, 11, 13, 8, 10 |
| 18 | Collect | 14 | 17, 16, 20, 15, 19, 18 | Discard | 7 | 9, 12, 11, 13, 8, 10 |

Both collected ranges are then sorted. For the third quartile the result is: 15, 16, 17, 18, 19, 20. The derived rank for the third quartile is $R'_{0.75} = 16 - 14 = 2$. Thus, the third quartile is 16. In the same way as described above, the median is evaluated as being 11.

| Listing - Pseudo Code |
|---|

```
type quantile = float{0..1}
type epsilon = float{0..1}
type rank = integer
type summary : element summary[ ]          summaries ordered by element rank
record element summary
        elem : float
        rmin : rank                         minimum possible rank of elem
        rmax : rank                         maximum possible rank of elem
record limit
        low : float                         lower bound on elements of some fixed rank
        high : float                        upper bound on elements of some fixed rank
record subset
        sub : bag of float                  subset of input not including the limits
        offset : integer                    input rank of sub's smallest element
        limit : limit
procedure main(Input : float[ ], Query : quantile[ ])
    var N := length of input
    var M := length of Query
    var Ranks : rank[ ]
    for I from 1 to M do
        Ranks[I] := floor(Query[I] * N) + 1     each quantile's rank
    end
    var Eps := optimize epsilon for two passes(N, M)
    var Summary := zhang wang(Input, Eps)       first pass over input
    var Limits := find limits(Summary, Ranks)
    var Subs := filter input(Input, Limits)     second pass over input
    var Quantiles := exact search(N, Subs, Ranks)
    output Quantiles
end
returns a root summary, i.e. the result of the final MERGE(S) in their paper
procedure zhang wang(Input : float[ ], Eps : epsilon) : summary
returns an epsilon so that the limits for every element in the summary are narrow enough to find
the requested quantiles by exact selection, by numerically solving an equation for the memory
requirements of both algorithms.
procedure optimize epsilon for two passes (N : integer, M : integer) : epsilon
    var Eps : epsilon
    var D := 8                              bytes per element (1 64-bit machine words)
    var B := (log Eps*N)/Eps                input block size for computing summary
    var L := log (N/B)                      number of levels in summary
    var H := 64                             overhead (bytes) per summary level
    var ApproxBytes := (B + 3) * 3 * D * L + H * L
    var ExactBytes := 4 * Eps * D * N * M
    solve ApproxBytes = ExactBytes for Eps numerically, for example, using the
    UnivariateSolverUtils from the open source Apache Commons Math project
    return Eps
end
```

```
Listing - Pseudo Code returns lower and upper bounds for the values between which an element of each specified rank
must occur in the input
procedure find limits(S : summary, Ranks : rank[ ]) : limit[ ]
    var Limits : limit[ ]
    for I from 1 to length of Ranks do
        var R := Ranks[I]
        var Idx : integer
        Idx := max({s | S[s].rmax < R})           binary search over S
        Limits[I].low := S[Idx].elem
        Idx := min({s | S[s].rmin > R})           binary search over S
        Limits[I].high := S[Idx].elem
    end
    return Limits
end
returns, for each requested quantile, a subset of input elements that could be that quantile. each
quantile is defined by the corresponding limits. requires one pass over the input, distributing the
elements into the corresponding subsets. this pass is not done if Zhang/Wang has already found
the exact result.
procedure filter input(Input : float[ ], Limits : limit[ ]) : subset[ ]
    var Subs : subset[ ]
    for I from 1 to length of Limits do
        if Limits[I].low < Limits[I].high then
            Subs[I].sub := {x ∈ Input | Limits[I].low < x < Limits[I].high})
            Subs[I].offset := length of {x ∈ Input | x ≤ Limits[I].low})
        end
        Subs[I].limit := Limits[I]
    end
    return Subs
end
returns the requested quantiles from their corresponding subsets
procedure exact search(N : integer, Subs : subset[ ], Ranks : rank[ ]) : float[ ]
    Qs : float[ ]
    for I from 1 to length of Ranks do
        sort(Subs[I].sub)                         any standard (in-situ) sorting algorithm
        var R := Ranks[I] - Subs[I].offset        rank in subset
        if R < 1
            then Qs[I] := Subs[I].limit.low       there were many elements on the lower limit
            else if R > length of Subs[I].sub     there were many high elements
                then Qs[I] := Subs[I].limit.high
                else Qs[I] := Subs[I].sub[R]
    end
    return Qs
end
```

IV. COMPUTER SYSTEM IMPLEMENTATION EXAMPLE

Figure 4:
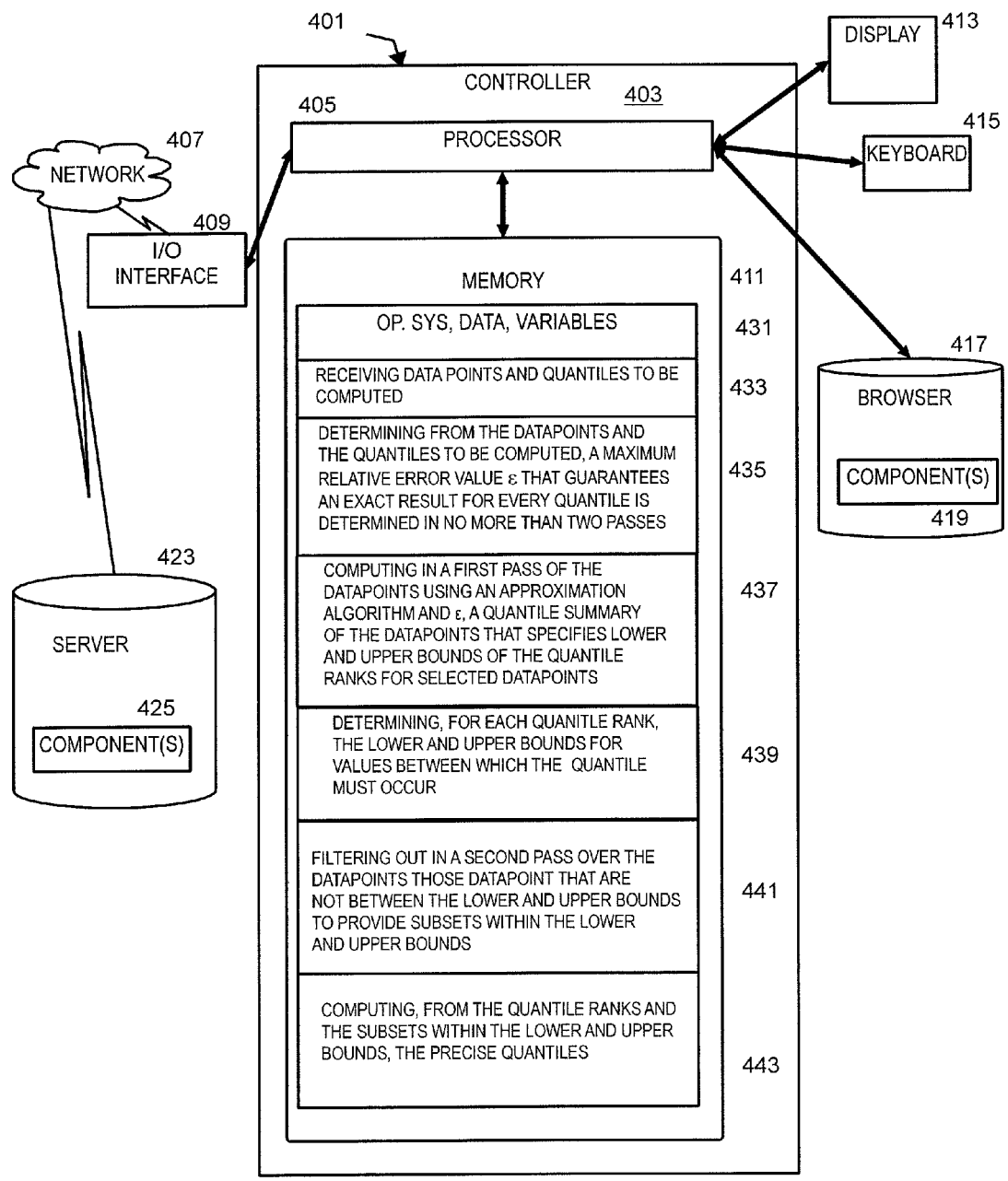
FIG. 4 is a block diagram that depicts relevant portions of a computer system for precise quantile determination.

FIG. 4 is a block diagram illustrating relevant portions of a computer system 401, on which the precise quantile determination may be implemented. The computer system 401 may include one or more controllers 403, a processor 405, an input/output (i/o) interface 409 for communication such as with a network 407, a memory 411, a display 413 (optional), and/or a user input device (also optional) such as a keyboard 415. Alternatively, or in addition to the keyboard 415, a user input device may comprise one or more of various known input devices, such as a keypad, a computer mouse, a touchpad, a touch screen, and a trackball. The display 413 may present information to the user by way of a conventional liquid crystal display (LCD) or other visual display, and/or by way of a conventional audible device (e.g., a speaker) for playing out audible messages. Portions of the computer system 401 are well understood to those of skill in this area and have been omitted to avoid obscuring the discussion. The processor 405 may comprise one or more microprocessors and/or one or more digital signal processors. The memory 411 may be coupled to the processor 405 and may comprise a read-only memory (ROM), a random-access memory (RAM), a programmable ROM (PROM), and/or an electrically erasable read-only memory (EEPROM). The memory 411 may include multiple memory locations for storing, among other things, an operating system, data and variables 431 for programs executed by the processor 405; computer programs for causing the processor to operate in connection with various functions such as receiving 433 datapoints and quantiles to be computed; determining 435 from the datapoints and the quantiles to be computed, a maximum relative error value s that guarantees that an exact result for every quantile is determined in no more than two passes; computing 437 in a first pass of the datapoints using an approximation algorithm and ϵ, a quantile summary of the datapoints that specifies lower and upper bounds of the quantile ranks for selected datapoints; determining 439 for each quantile rank, the lower and upper bounds for values between which the quantile must occur; filtering out 441 in a second pass over the datapoints, those datapoints that are not within the lower and upper bounds to provide subsets within the lower and upper bounds; and computing 443, from the quantile ranks and the subsets within the lower and upper bounds, the precise quantiles. The computer programs may be stored, for example, in ROM or PROM and may direct the processor 405 in controlling the operation of the computer 401. Each of these functions has been considered in extensive detail above.

The user may invoke functions accessible through the user input device such as the keyboard 415. The user input device may comprise one or more of various known input devices, such as a keyboard (415, illustrated) and/or a pointing device, such as a mouse; the keyboard 415 may be supplemented or replaced with a scanner, card reader, or other data input device; and the pointing device may be a mouse, touch pad control device, track ball device, or any other type of pointing device.

Responsive to manual signaling from the user input device represented by the keyboard 415, in accordance with instructions stored in memory 411, and/or automatically upon receipt of certain information via the i/o interface 409, the processor 405 may direct the execution of the stored programs.

The computer 401 can utilize a browser 417, which includes several browser component(s) 419.

The computer 401 can access a server 423 on which is stored one or more components, here represented by server component(s) 425. Although the components 425 are illustrated as accessed over the network 407, the components 425 may be remotely and/or locally accessible from the computer 401, over a wired and/or wireless connection; the components 425 do not need to be limited to a database or a server. Techniques are known for accessing components located in a server 423, and the like.

With regard to the server 423 and browser 417, it may be noted that the computer programs stored in the memory 411 are illustrated on the controller 403. In a client/server embodiment, one or more of the computer programs conveniently may be distributed to the server, such as those marked "SERVER", and one or more of the computer programs conveniently may be distributed to a client side, such as those marked "BROWSER". In such a situation, the server 423 may omit the client computer programs, and the client may omit the server computer programs. In another embodiment, the computer programs may be included on a non-client-server architecture, and the requests between client-servers may be omitted.

As will be understood in this field, besides the functions discussed above, the memory 411 can include other miscellaneous information in a misc. database, not shown, along with the usual temporary storage and other instructions for other programs not considered herein.

The computer 401 can accommodate one or more disk drives or removable storage (not illustrated). Typically, these might be one or more of the following: a flash memory, a floppy disk drive, a hard disk drive, a CD ROM, a digital video disk, an optical disk, and/or a removable storage device such as a USB memory stick, variations and evolutions thereof. The number and type of drives and removable storage may vary, typically with different computer configurations. Disk drives may be options, and for space considerations, may be omitted from the computer system used in conjunction with the processes described herein. The computer may also include a CD ROM reader and CD recorder, which are interconnected by a bus along with other peripheral devices supported by the bus structure and protocol (not illustrated). The bus can serve as the main information highway interconnecting other components of the computer, and can be connected via an interface to the computer. A disk controller (not illustrated) can interface disk drives to the system bus. These may be internal or external. The processor 405, memory 411, a disk drive and/or removable storage medium are referred to as "computer-readable storage media" and provide non-transitory storage of computer programs and data.

It should be understood that FIG. 4 is described in connection with logical groupings of functions or resources. One or more of these logical groupings may be performed by different components from one or more embodiments. Likewise, functions may be grouped differently, combined, or augmented without parting from the scope. Similarly, the present description may describe or imply various databases or collections of data and information. One or more groupings of the data or information may be omitted, distributed, combined, or augmented, or provided locally and/or remotely without departing from the scope.

V. GLOSSARY

Terms as used herein are intended to be interpreted as understood to one of skill in the art of statistical analysis using quantile determination instead of as interpreted by a more general dictionary.

The claims may use the following terms, which are defined to have the following meanings for the purpose of the claims herein. Other definitions may be specified in this document.

The term "computer system" or "computer" used herein denotes a device sometimes referred to as a computer, laptop, personal computer, tablet computer, handheld computer, smart phone, personal digital assistant, notebook computer, personal assignment pad, server, client, mainframe computer, minicomputer, or evolutions and equivalents thereof.

The term "quantile" is used herein to denote one of the following:
 (1) The element that divides a given set of values into two parts where all elements in the first part are less than or equal to any element in the second part. The number of elements in the first part is equal to a given fraction $\phi$ of the total set.
 (2) The fraction $\phi$.

The term "quantile rank" is used herein to denote the fraction $\phi$ as used in the aforementioned definition of "quantile."

The term "rank" is used herein to denote a number specifying a position in a numerically ordered series.

The phrase "automatically without manual intervention," when used in a claim, is defined to mean that the particular step occurs after the step is initiated until limitations recited in the step are finished without requiring a user to provide input to a processor.

VI. IMPLEMENTATIONS AND TECHNICAL NOTES

The above discussion has assumed that the reader has a sufficient background for appreciating the points made. This section provides some implementation and/or technical notes which discuss some basic technical information that may be relevant to the above.

This discussion has involved particular examples. However, the principles may be applied to other examples and/or realizations. Naturally, the relevant data may differ, as appropriate. Further, an embodiment has been discussed in certain examples as if it is made available by a provider to a single customer with a single site. An embodiment may be used by numerous users, if preferred, for example, over distributed systems.

It is further understood that the use of relational terms such as first and second, and the like, if any, are used solely to distinguish one from another entity, item, or action without necessarily requiring or implying any actual such relationship or order between such entities, items or actions.

It is noted that some embodiments may include a plurality of processes or steps, which can be performed in any order, unless expressly and necessarily limited to a particular order, i.e., processes or steps that are not so limited may be performed in any order.

Much of the inventive functionality and many of the inventive principles when implemented, are best supported with or in software or one or more integrated circuits (ICs), such as a central processing unit (CPU) which is the hardware that carries out instructions of a computer program, and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

The various embodiments that demonstrate a method and/or system for precise quantile determination have been discussed in detail above. It should be further noted that the above-described processes can be stored as instructions in computer-readable storage medium. When the instructions are executed by a computer, for example after being loaded from a computer-readable storage medium, the process(es) are performed.

The detailed descriptions, which appear herein, may be presented in terms of program procedures executed on a computer or a network of computers. These procedural descriptions and representations herein are the means used by those skilled in the art to most effectively convey the substance of their work to others skilled in the art.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the discussion herein may contemplate the use of an operator, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will be apparent from the description given herein.

A computer-readable storage medium is tangible and non-transitory; a computer-readable storage medium can be any of the memory or storage devices, such as those examples described above, or other removable or fixed storage medium, provided such computer-readable storage medium is tangible and non-transitory.

Furthermore, any communication network implicated in an embodiment can include, by way of example but not limitation, data and/or packet communications networks, which can provide wireless communications capability and/or utilize wireline connections such as cable and/or a connector, or similar. Any appropriate communication protocol may be used.

The system used in connection herewith may (or may not) rely on the integration of various components including, as appropriate and/or if desired, by way of example but not limitation, hardware and software servers, applications software, database engines, server area networks, firewall and SSL security, production back-up systems, and/or applications interface software. An embodiment may be, by way of example but not by way of limitation, network-based and may (or may not) utilize a network such as the Internet or other network as an exemplary interface with the user for information delivery.

One or more databases implicated by the above discussion may be, by way of example but not limitation, in a relational database format, but other standard data formats may also be used. Optionally, the various databases may include a known conversion system capable of receiving data in various standard formats.

One or more displays for the system may be developed in connection with, by way of example but not limitation, HTML display format. Although HTML may be a preferred display format, it is possible to utilize alternative display formats for interacting with a user and obtaining user instructions.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for precise quantile determination comprising:
   receiving, by a processor, datapoints and one or more quantiles to be computed;
   determining, by the processor, from the datapoints and the one or more quantiles to be computed, a maximum relative error value e so that a rank distance between two adjacent elements in all of the one or more quantiles is at most $2\epsilon$, wherein the maximum relative error value $\epsilon$ guarantees that an exact result for every quantile is determined in no more than two passes;
   computing, by the processor, in a first pass of the datapoints using an approximation algorithm and the maximum relative error value $\epsilon$, a quantile summary of the datapoints that specifies lower and upper bounds of the quantile ranks for selected datapoints;

determining, by the processor, for each quantile rank, the lower and upper bounds for values between which the quantile must occur;

filtering out, by the processor, in a second pass over the datapoints those datapoints that are not between the lower and upper bounds to provide subsets within the lower and upper bounds; and computing, by the processor, from the quantile ranks and the subsets which were provided by the filtering out within the lower and upper bounds which were specified using the maximum relative error value $\epsilon$, the precise quantiles.

2. The method of claim 1, wherein the value for the maximum relative error $\epsilon$ is determined by solving the following equations:

$$M_{approx}=(b+3)3dL+hL$$

$$M_{exact}=4\epsilon NdM$$

$$M_{approx}=M_{exact},$$

such that $M_{approx}$ and $M_{exact}$ are memory consumptions, M is the number of requested quantiles, b is a block size for partitioning input buffers, d is memory per entry, L is a number of levels in the quantile summary, h is additional overhead for pointers that connect the levels in the quantile summary, and N is an amount of the datapoints.

3. The method of claim 1, wherein when the lower and upper bounds for all quantiles are identical, then the precise quantile determination is complete.

4. The method of claim 1, wherein the filtering out step further comprises:

collecting, by the processor, the datapoints that lie between the lower and upper bounds;

counting/excluding, by the processor, the datapoints that are on or below the lower bound;

sorting, by the processor, the datapoints that lie between the lower and upper bounds;

selecting, by the processor, a datapoint of a requested rank from the sorted datapoints; and simultaneously correcting, by the processor, the requested rank by the number of datapoints on or below the lower bound.

5. The method of claim 1, wherein the algorithm has a runtime complexity of $O(N \log(1/\epsilon \log(\epsilon N)))$, such that N is the size of the input.

6. A system for precise quantile determination comprising:

a memory; and a processor cooperatively operable with the memory, and configured to, based on instructions stored in the memory, receive datapoints and one or more quantiles to be computed;

determine from the datapoints and the one or more quantiles to be computed, a maximum relative error value $\epsilon$ so that a rank distance between two adjacent elements in all of the one or more quantiles is at most $2\epsilon$, wherein the maximum relative error value $\epsilon$ guarantees that an exact result for every quantile is determined in no more than two passes;

compute in a first pass of the datapoints using an approximation algorithm and the maximum relative error value $\epsilon$, a quantile summary of the datapoints that specifies lower and upper bounds of the quantile ranks for selected datapoints;

determine for each quantile rank, the lower and upper bounds for values between which the quantile must occur;

filter out in a second pass over the datapoints those datapoints that are not between the lower and upper bounds to provide subsets within the lower and upper bounds; and compute from the quantile ranks and the subsets which were provided by the filtering out within the lower and upper bounds which were specified using the maximum relative error value $\epsilon$, the precise quantiles.

7. The system of claim 6, wherein the value for the maximum relative error $\epsilon$ is determined by solving the following equations:

$$M_{approx}=(b+3)3dL+hL$$

$$M_{exact}=4\epsilon NdM$$

$$M_{approx}=M_{exact},$$

such that $M_{approx}$ and $M_{exact}$ are memory consumptions, M is the number of requested quantiles, b is a block size for partitioning input buffers, d is memory per entry, L is a number of levels in the quantile summary, h is additional overhead for pointers that connect the levels in the quantile summary, and N is an amount of datapoints.

8. The system of claim 6, wherein when the lower and upper bounds for all quantiles are identical, then the precise quantile determination is complete.

9. The system of claim 6, wherein the processor filters out from the datapoints those datapoints that are not between the lower and upper bounds by:

collecting the datapoints that lie between the lower and upper bounds;

counting/excluding the datapoints that are on or below the lower bound;

sorting the datapoints that lie between the lower and upper bounds;

selecting a datapoint of a requested rank from the sorted datapoints; and simultaneously correcting the requested rank by the number of datapoints on or below the lower bound.

10. The system of claim 6, wherein the algorithm has a runtime complexity of $O(N \log(1/\epsilon \log(\epsilon N)))$, such that N is the size of the input.

11. A non-transitory computer readable medium comprising executable instructions for a method for precise quantile determination, the instructions being executed on a processor to perform:

receiving datapoints and one or more quantiles to be computed;

determining from the datapoints and the one or more quantiles to be computed, a maximum relative error value $\epsilon$ so that a rank distance between two adjacent elements in all of the one or more quantiles is at most $2\epsilon$, wherein the maximum relative error value $\epsilon$ guarantees that an exact result for every quantile is determined in no more than two passes;

computing in a first pass of the datapoints using an approximation algorithm and the maximum relative error value $\epsilon$, a quantile summary of the datapoints that specifies lower and upper bounds of the quantile ranks for selected datapoints;

determining for each quantile rank, the lower and upper bounds for values between which the quantile must occur;

filtering out in a second pass over the datapoints those datapoints that are not between the lower and upper bounds to provide subsets within the lower and upper bounds; and computing from the quantile ranks and the subsets which were provided by the filtering out within the lower and upper bounds which were specified using the maximum relative error value $\epsilon$, the precise quantiles.

12. The non-transitory computer readable medium of claim 11, wherein the value for the maximum relative error $\epsilon$ is determined by solving the following equations:

$$M_{approx}=(b+3)3dL+hL$$

$$M_{exact}=4\epsilon NdM$$

$$M_{approx}=M_{exact},$$

such that $M_{approx}$ and $M_{exact}$ are memory consumptions, M is the number of requested quantiles, b is a block size for partitioning input buffers, d is memory per entry, L is a number of levels in the quantile summary, h is additional overhead for pointers that connect the levels in the quantile summary, and N is an amount of the datapoints.

13. The non-transitory computer readable medium of claim 11, wherein when the lower and upper bounds for all quantiles are identical, then the precise quantile determination is complete.

14. The non-transitory computer readable medium of claim 11, wherein the filtering out step further comprises:
   collecting, by the processor, the datapoints that lie between the lower and upper bounds;
   counting/excluding, by the processor, the datapoints that are on or below the lower bound;
   sorting, by the processor, the datapoints that lie between the lower and upper bounds;
   selecting, by the processor, a datapoint of a requested rank from the sorted datapoints; and
   simultaneously correcting, by the processor, the requested rank by the number of datapoints on or below the lower bound.

15. The non-transitory computer readable medium of claim 11, wherein the algorithm has a runtime complexity of $O(N \log(1/\epsilon \log(\epsilon N)))$, such that N is the size of the input.

* * * * *